US012783698B2

(12) United States Patent
Leonhardt

(10) Patent No.: US 12,783,698 B2
(45) Date of Patent: Nov. 3, 2026

(54) SYSTEM AND METHOD FOR DATA-TRANSFER MANAGEMENT

(71) Applicant: Fresenius Medical Care Deutschland GmbH, Bad Homburg (DE)

(72) Inventor: Eugen Leonhardt, Bad Homburg (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 86 days.

(21) Appl. No.: 18/909,696

(22) Filed: Oct. 8, 2024

(65) Prior Publication Data

US 2025/0139261 A1 May 1, 2025

(30) Foreign Application Priority Data

Oct. 27, 2023 (EP) .................................... 23206441

(51) Int. Cl.
*G06F 21/60* (2013.01)
*H04L 9/00* (2022.01)

(52) U.S. Cl.
CPC .............. *G06F 21/606* (2013.01); *H04L 9/50* (2022.05)

(58) Field of Classification Search
CPC .... G06F 21/606; G06F 21/6245; G06F 21/64; H04L 63/10; H04L 9/3239; H04L 9/50
See application file for complete search history.

(56) References Cited

U.S. PATENT DOCUMENTS 11,240,003 B2 * 2/2022 Cao ........................ H04L 9/3213
2017/0302678 A1 * 10/2017 Borlick ............... H04L 67/1097
2018/0082023 A1 3/2018 Curbera et al.
2019/0188411 A1 * 6/2019 Kroutik ................. H04L 9/3297
2019/0294817 A1 * 9/2019 Hennebert ............ H04L 9/0861
2019/0354693 A1 * 11/2019 Yoon .......................... H04L 9/50
2019/0392162 A1 12/2019 Stern et al.
2020/0159928 A1 * 5/2020 Herrin ..................... H04L 67/56
2020/0320217 A1 * 10/2020 Shang ...................... G06F 21/64
2020/0336475 A1 * 10/2020 Padmanabhan ..... G06F 21/6245
2020/0364358 A1 11/2020 Karia et al.
(Continued)

FOREIGN PATENT DOCUMENTS

WO WO-2020169502 A1 * 8/2020 ............... H04L 9/50
WO WO-2021079925 A1 * 4/2021 ............. G16H 10/60

OTHER PUBLICATIONS

Alhajri, May, Carsten Rudolph, and Ahmad Salehi Shahraki. "A blockchain-based consent mechanism for access to fitness data in the healthcare context." IEEE Access 10 (2022): 22960-22979. (Year: 2022).*

(Continued)

*Primary Examiner* — Michael Simitoski
(74) *Attorney, Agent, or Firm* — Leydig, Voit & Mayer, Ltd.

(57) ABSTRACT

A computer-implemented method of securing data transfers includes the steps of defining two or more sets of conditions for executing a data transfer as sequence of user-consent steps in the form of respective smart contracts, receiving a data-transfer request, determining a required security for the data-transfer request, selecting one of the defined sets of conditions according to the determination, requesting user consent according to the sequence defined by the smart contract respective to the selected set of conditions, and executing requested data transfer after all requested user consent is approved.

19 Claims, 2 Drawing Sheets

(56) References Cited

U.S. PATENT DOCUMENTS

| | | | | |
|---|---|---|---|---|
| 2021/0042805 | A1* | 2/2021 | Clauss | G06F 16/24568 |
| 2021/0099313 | A1* | 4/2021 | Kondrashov | H04L 67/5683 |
| 2021/0182423 | A1* | 6/2021 | Padmanabhan | H04L 9/3271 |
| 2021/0390196 | A1 | 12/2021 | Lavine et al. | |
| 2022/0050915 | A1* | 2/2022 | Hsy | G06F 21/64 |
| 2023/0281333 | A1* | 9/2023 | Ricotta, Jr. | G16H 10/20<br>726/1 |
| 2023/0315904 | A1* | 10/2023 | Lemieux | H04L 9/3218<br>705/3 |
| 2024/0184916 | A1* | 6/2024 | Bella | H04W 12/084 |
| 2024/0362357 | A1* | 10/2024 | Patel | G06F 21/6245 |
| 2024/0362358 | A1* | 10/2024 | Patel | G06F 21/6245 |
| 2025/0053624 | A1* | 2/2025 | Shirai | H04L 9/32 |
| 2025/0131994 | A1* | 4/2025 | Gross | G16H 20/00 |

OTHER PUBLICATIONS

Merlec, Mpyana Mwamba, et al. “A smart contract-based dynamic consent management system for personal data usage under GDPR.” Sensors 21.23 (2021): 7994. (Year: 2021).*

European Patent Office, Extended European Search Report in European Patent Application No. 23206441.0, 9 pages (Apr. 4, 2024).

* cited by examiner

SYSTEM AND METHOD FOR DATA-TRANSFER MANAGEMENT

CROSS-REFERENCE TO RELATED APPLICATION

Priority is claimed to European Patent Application No. EP 23206441.0, filed on Oct. 27, 2023, the entire disclosure of which is hereby incorporated by reference herein.

FIELD

The present disclosure relates to computer-implemented methods and systems for securing data transfers.

BACKGROUND

Securing data and their transfers against unintended access is a major objective of modern data management. The explosive rise in data quantity, their value in terms of generation cost and potential impact, and accelerating regulatory and technical demand on their security motivates a recent interest in a systematic yet flexible, future-proof approach to data management. Particularly, management of sensitive data, such as medical data, that are subject to additional regulatory demands, e.g. General Data protection (GDPR), Health Insurance Portability and Accountability Act (HIPAA), etc., pose a challenge: how to balance technical demand and additional demand imposed by evolving regulatory standards while assuring the security integrity of inherently valuable data content.

One technical approach is found in the blockchain technology, employing distributed ledgers, that inherently brings about the attributes of decentralization, immutability and tamper-proof verification to an incorporating data-management system—attributes that contribute to addressing the challenge posed above.

While early generations of blockchain solutions, e. g. around the Bitcoin use cases, specifically when employing proof-of-work consensus algorithms, were considered too technically demanding and too rigid for application in blockchain-assisted data-management, modern solutions, specifically the ones based on proof-of-stake consensus algorithms, provide flexibility for practical use.

Latest approaches to data management incorporating distributed ledgers have recognized that, for security and efficiency reasons, sensitive data is best not to be stored on the ledgers but instead they make use of smart contracts, i.e., blockchain-implemented algorithms, to regulate off-chain data transactions. This combines the benefits of the blockchain technology with conventional data-management means while both reducing the demand on the still resource-intensive processing within a blockchain environment and the potential exposure of the sensitive data in a distributed system.

Some applications of blockchain-regulated, as opposed to widely used exclusively blockchain-implemented, data-management systems are known.

Particularly with application to sensitive medical data, U.S. Patent Publication No. 2018/0082023 A1 describes blockchain-based methods and systems for securing transfers of off-chain data using regulations implemented as smart contracts stored on a blockchain. Specifically, it describes the implementation of smart contracts in a transaction manager to provide governance and control of the transactions involving the exchange of data, such as controlling data segregation, implementing controls over when, in what manner, and for how long an entity may access and/or store the data.

While smart contracts have been flexibly used to implement regulations for a variety of off-chain data transfers, even the most modern blockchain solutions are faced with the inherent technical demand on the blockchain system; i.e., that every transaction subject to smart-contract regulation requires dedicated resources, such as processing time, energy, etc., inherent to the consensus algorithm of the blockchain. For practical application in large-scale data transfers potentially incorporating countless transactions, a reduceable and scalable demand on the system, balanced against an increasable security standard, is considered an unmet need for which adequate solutions have not yet been met in the prior art.

SUMMARY

In an exemplary embodiment, the present disclosure provides a method of securing data transfers. The method includes: defining, by a middle layer subsystem of a blockchain-regulated data-management system, two or more sets of conditions for executing a data transfer as a sequence of user-consent steps in the form of respective smart contracts; receiving, by the middle layer subsystem, a data-transfer request; determining, by the middle layer subsystem, a required security for the data-transfer request; selecting, by the middle layer subsystem, one of the defined sets of conditions according to the determination; requesting, by the middle layer subsystem, user consent according to the sequence; and executing, by the middle layer subsystem, the requested data transfer after all requested user consent is approved.

In another exemplary embodiment, the present disclosure provides a middle layer subsystem of a blockchain-regulated data-management system for securing data transfers. The middle layer subsystem includes: interfaces to one or more user systems; one or more interfaces to a database; one or more interfaces to a distributed-ledger system; and a processor configured to: create, based on input from the interfaces to the one or more user systems and/or the one or more interfaces to the database, two or more sets of conditions for executing a data transfer to or from the database as a sequence of user-consent steps in the form of respective smart contracts to be stored on the distributed ledger system; and determine a required security for the requested data transfer.

In yet another exemplary embodiment, the present disclosure provides a non-transitory computer-readable medium having processor-executable instructions stored thereon for securing data transfers. The processor-executable instructions, when executed, facilitate performance of the following: defining, by a middle layer subsystem of a blockchain-regulated data-management system, two or more sets of conditions for executing a data transfer as a sequence of user-consent steps in the form of respective smart contracts; receiving, by the middle layer subsystem, a data-transfer request; determining, by the middle layer subsystem, a required security for the data-transfer request; selecting, by the middle layer subsystem, one of the defined sets of conditions according to the determination; requesting, by the middle layer subsystem, user consent according to the sequence; and executing, by the middle layer subsystem, the requested data transfer after all requested user consent is approved.

DESCRIPTION OF THE DRAWINGS

Exemplary embodiments of the present disclosure will be described in even greater detail below based on the exemplary figures. The application is not limited to the exemplary embodiments. All features described and/or illustrated herein can be used alone or combined in different combinations in embodiments of the application. Features and advantages of various embodiments of the present application will become apparent by reading the following detailed description with reference to the attached drawings which illustrate the following.

DETAILED DESCRIPTION

Figure 1:
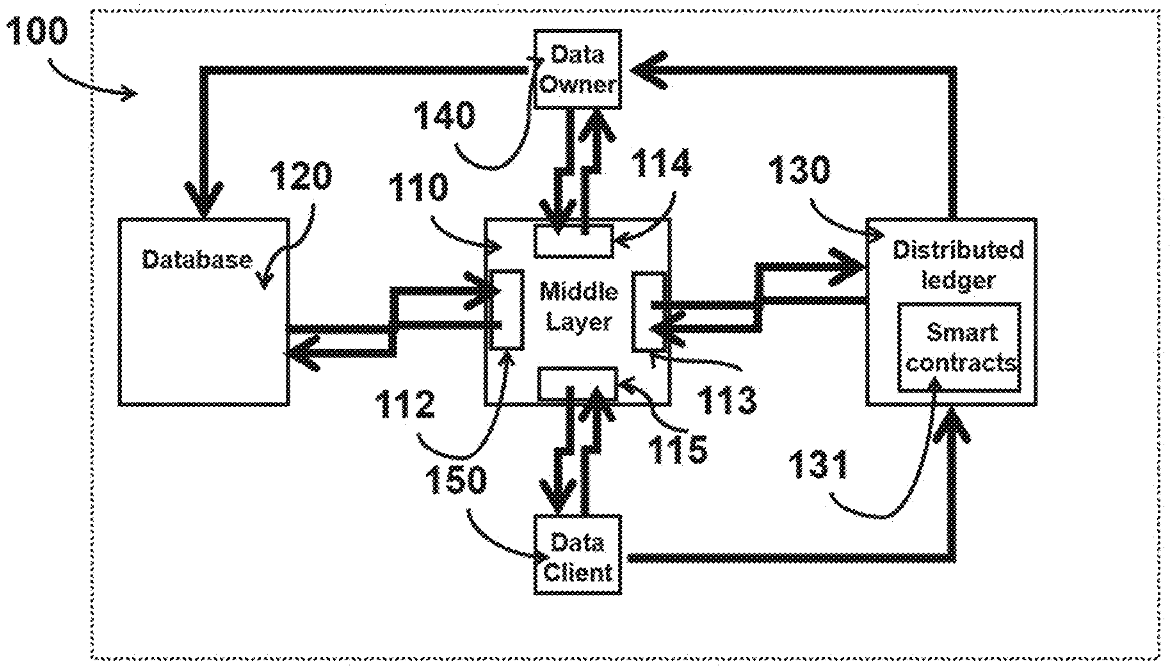
FIG. 1 is a schematic depicting components of a system according to an embodiment the present disclosure.

In an exemplary embodiment, the present disclosure provides a computer-implemented method of securing data transfers comprising the steps of defining two or more sets of conditions for executing a data transfer as sequence of user-consent steps in the form of respective smart contracts, receiving a data-transfer request, determining a required security for the data-transfer request, selecting one of the defined sets of conditions according to the determination, requesting user consent according to the sequence defined by the smart contract respective to the selected set of conditions, and executing requested data transfer after all requested user consent is approved.

In another exemplary embodiment, the present disclosure provides a system for securing data transfers comprising interfaces to one or more user systems, one or more interfaces to a database, and one or more interfaces to a distributed-ledger system, wherein the system is configured to create, based on input from the user interfaces, two or more sets of conditions for executing a data transfer from/to the database as sequence of user-consent steps in the form of respective smart contracts to be stored on the distributed ledger component, and wherein the system is further configured to determine a required security for the requested data transfer.

In view of the foregoing, exemplary embodiments of the present disclosure provide that more than one regulation for data transfers is generated to be stored on a distributed ledger. In this way the flexibility of the system can be technically implemented in a wide variety suiting the particular kinds of data transfers to be executed.

Additionally, a determination of a required security level for a requested data-transfer request is performed. This allows, after the subsequent selection based on the determination, to regulate, using smart contracts, the data transfer primarily based on implementing a certain security level; e.g., as inferred from the request and/or the underlying data.

The implementation of the smart contracts as sequence of user consent requests and approvals makes sure that potentially all parties participating in the data transfer can, by inevitable regulation, influence the execution of all transactions incorporated in the data transfer. Only when all required consent requests are approved, the requested data transfer is executed.

Thus, exemplary embodiments of the present disclosure do not overshoot with respect to security regulation (i.e. translating into required system resources) while still meeting the required approvals on all granular levels of users and data involved.

Exemplary embodiments of the present disclosure provide a middle layer between the components of a blockchain-regulated data-management system. In this middle layer, a method of securing data transfers can be implemented while ensuring no direct contact between the components of the broader system with regards to data-transfer regulations. This serves as an advantageous filtering component for requests entering the system to prevent external influence on data-transfers. This also serves as an independent buffer component that prevents any data leaks that would be possible via direct component-to-component contact.

Exemplary embodiments of the present disclosure will be described below with reference to the figures.

It will be appreciated that these exemplary embodiments are merely examples, and that various variations, changes, and substitutions may occur to those of ordinary skill in the art without departing from the principles of the present disclosure.

A schematic of the general architecture of a blockchain-regulated data-management system 100 is depicted in FIG. 1. Exemplary embodiments of the present disclosure further provide system 110 implemented as a middle layer connecting the other system components.

The depicted system components include a distributed ledger subsystem 130, on which smart contracts 131 are executed to regulate data transfers between other system components; one or more localized or distributed databases 120, which serve as storage for data to be transferred as regulated by the smart contracts 131, and user subsystems 140, 150 as system access points for parties participating in a data transfer. Generally, one such user subsystem is sufficient if system 100 is solely used as a one-party storage system. Applicability to a data-transfer system makes two or more such user subsystems reasonable, while the amount of different user subsystems can be expanded to enable multi-party data transfers.

In an exemplary embodiment, a subsystem 110, the middle layer, is provided to connect database 120, user subsystems 140, 150, and distributed ledger components 130. The middle layer 110 comprises interfaces 114, 115 to the user components 140, 150 respectively. It further comprises an interface 112 to the database 120 and an interface 113 to the distributed ledger 130.

The middle layer 110 is implemented as a computer-implemented system with capability to use the implementing computer's resources for processing data according to the middle layer 110 configuration. Such a configuration comprises the control of data input/output between middle layer 110 and system components 120, 130, 140, 150 via respective interfaces 112, 113, 114, 115. It will be appreciated that various implementations in personal computing devices, servers (local and/or distributed), mobile computing devices, and other computer systems may be utilized.

The middle layer 110 is further configured to create, based on input from the user interfaces 114, 115, two or more sets of conditions for executing a data transfer from/to the database 120 as a sequence of user-consent steps in the form of respective smart contracts 131 to be stored on the distributed ledger component 130. Such a set of conditions can be implemented by a set of unique identifiers assignable to different users (e.g. IP addresses) and/or a set of unique identifiers assignable to data packages (e.g. their location on a specific database 120, metadata, etc.). Additionally, the set of conditions may comprise a particular sequence for the conditions to be met or, opposing this, a parallel sequence-independent fulfillment of the conditions can be implemented. Advantageously, the middle layer 110 is configured for generation of two or more different sets of such conditions translating to multiple smart contracts 131. The availability of a multitude of smart contracts 131 provided in this way allows for adapting the system with regards to its data-transfers by selection of the better suited smart contract 131 defined.

The middle layer 110 is further configured to determine a required security for the requested data transfer. This determination is performed by processing the requests received via user interfaces 114, 115. In one embodiment such requests directly comprise an indication of required security. In one other or additional embodiments, such requests comprise an indication for requested data, wherein the database 120 holds further information about the requested data pertaining to a security requirement, which is supplied to the middle layer 110 via interface 112 for the determination. In a preferred embodiment, the determination is aimed at employing the minimum, maximum, or average of different quantifiable security requirements by different user subsystems 140, 150 and/or the database 120.

In a preferred embodiment, the middle layer 110 is further configured for creating the smart contracts 131 by balancing the determined required data-transfer security and total complexity of the transactions comprised in the data transfer. For this, a requested data transfer is understood as a multitude of transactions to performed, wherein a transaction potentially requires approval with regards to the smart contract 131, and wherein one transaction in the case of highest granularity concerns two specific users and one specific set of data. Since every transaction to be regulated by the smart contract 131 implemented in the distributed-ledger 130 adds to the total demand on the ledger 130 system, a trade-off between a maximum number of possible transactions, which equals to the highest security, and a minimum amount of required transactions, which equals to highest system 130 efficiency, is to be considered, and this is technically implemented in this embodiment. The balancing relates to a comparison of security levels determined as required by the middle layer 110 and the security levels attributable to the multiple defined sets of conditions created by the middle layer 110 as smart contracts 131 on the distributed ledger 130. In a straightforward implementation, the balancing identifies the one of the multiple defined sets of conditions, which can be attributed the lowest security level above the security defined as required.

In a preferred embodiment, the middle layer 110 is further configured to prompt execution of data transfers from/to the database 120 after receiving a prompt from the interface 113 to the distributed-ledger system 130. Preferably, such a prompt from the ledger 130 is the result of successful execution of a set of conditions implemented as smart contract 131. Routing the data-transfer prompt via interfaces 113 over the middle layer 110 and via interface 112 to the database 120, as opposed to a direct connection between ledger 130 and database 120, brings about multiple advantageous effects. First, the middle layer serves as a filter component that prevents prompts to cause data transfers that are not intended by the users of the system. Given that the ledger 130 is a potentially open system, this reduces the risk of unauthorized data access. Additionally, only one interface between ledger 130 and data storage components needs to be provided in case of a distributed data base 120. This reduces the demand on the ledger system 130 as the prompt for data-transfer resulting from any successfully executed smart contract 131 becomes invariant of the data location. Furthermore, any definitions of users and processing required for execution of data transfers can be implemented within the middle layer 110, reducing the requirement on the database 120. Following the data-transfer prompt received by the database 120, the requested data preferably is handled in a way similar to the data-transfer prompts—i.e., via interface 112 over the middle layer 110 to the receiving user 140, 150 via user interfaces 114, 115—which allows for additional data verification and processing within the middle layer 110 independent of the user systems 140, 150.

In one aspect of the present disclosure, the middle layer 110 is further configured to transmit consent-request data to one or more user/users 140, 150 via respective interfaces 114, 115 from the distributed-ledger system 130 and to transmit consent-approval data from the one or more users 140, 150 via respective interfaces 114, 115 to the distributed-ledger system 130. Since the smart contract 131 is implemented as a set of conditions related to consent, e.g. of users participating in a data transfer, and as potentially several different parties are involved in different transactions comprised in the requested data transfer, it is favorable to employ the middle layer 110 as a central subsystem for collection and redirection of related consent requests and approvals. The specifics of the consent required for successful execution of a smart contract 131 may comprise one or more users, a potential sequence of required user interactions, specific data with regards to which consent is required, etc. Implementing the request/approval process within the processing performed by the middle layer 110 reduces the technical demand on the ledger component 130 since it only has to verify the conditions defined by the smart contract 131 without taking care of how consent is approved. Additionally, any changes to the specifics of the users 140, 150 and to metadata relating to specific data stored in the database 120 can be reflected by editing the configuration of the middle layer 110 without requiring transactions on the ledger 130. Similar as for avoiding the direct connection between ledger 130 and database 120, the middle layer 110 contributes to the total system security by preventing direct connections between users 140, 150 and the ledger 130.

In one aspect of the present disclosure, the middle layer 110 is implemented in a hardware environment configured for exclusive execution of the system 110 and the corresponding processes. In the specific case subject to the present disclosure, a hardware component which is limited in its functions further reduces the risk for outside influence on the system 100 by excluding data connections and/or functionalities not intended by the system 100. Thus, the security can be further increased.

The middle layer 110 is preferably further configured to execute a method according to the present disclosure, which is further described below.

Figure 2:
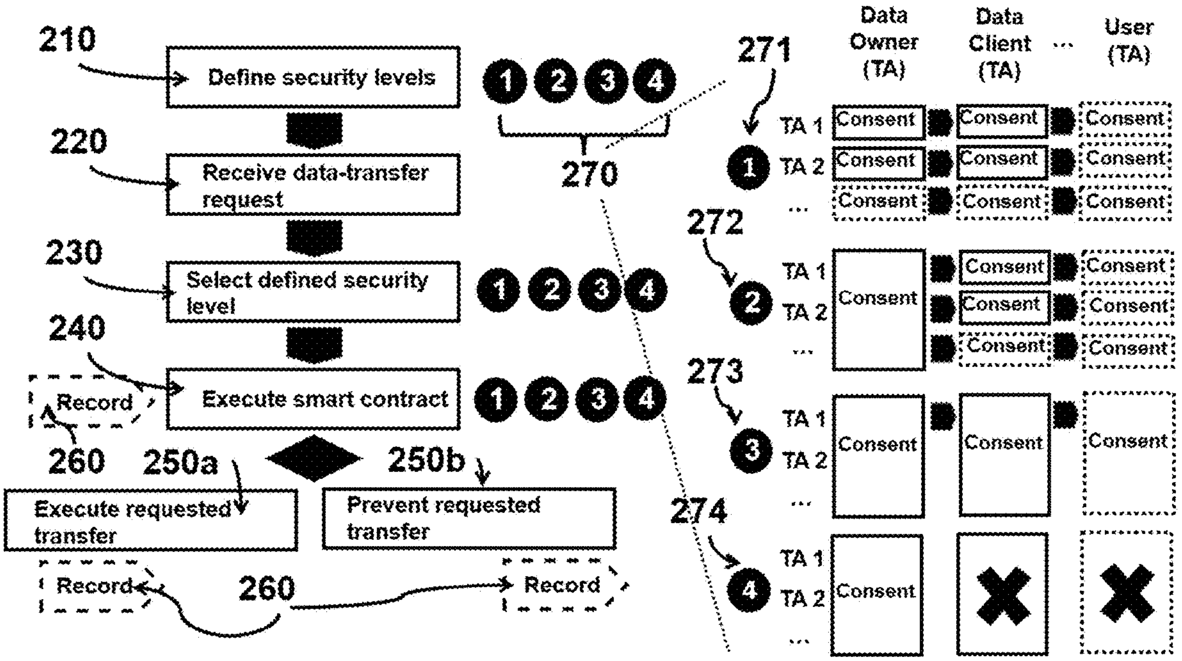
FIG. 2 is flowchart depicting process steps of methods according to embodiments of the present disclosure.

A computer-implemented method of the present disclosure is schematically depicted in the flowchart of FIG. 2.

The computer-implemented method includes the steps of defining 210 two or more sets of conditions 270 for executing a data transfer as sequence of user-consent steps in the form of respective smart contracts, receiving a data-transfer request 220, determining a required security for the data-transfer request, selecting 230 one of the defined sets of conditions according to the determination, requesting user consent according to the sequence defined by the smart contract respective to the selected set of conditions 240, and executing 250_a_ requested data transfer after all requested user consent is approved. If the set of conditions, in whole or partially, is not fulfilled, e.g. if one consent request is not approved, the method prevents 250_b_ the requested data-transfer instead of executing it. The definition 210 of a multitude of sets of conditions as smart contracts strictly limits the content and form of a generic smart contract. The defined conditions directly relate to a defined sequence of consent process steps to be performed for the smart contract to be considered successfully executed. In a generic case the consent process is performed by triggering, based on the smart contract, consent requests to be transferred to respective users, and to transfer, after consent, the consent approval from the user back for validation to the smart contract. A smart contract defined in this way differentiates, in terms of the set of conditions, the approver of a consent and the object being consented to, e.g. different data assets making up a requested data transfer. Granularity both in user and object of consent are flexible and are the distinguishing factor between the at least two defined sets of conditions. Since every consent process, in the general case, requires an interaction with the smart contract, it is of interest to reduce the granularity to a minimum (least consent processes required). This is contrary to the aim of maximizing the security of the requested data transfer. Therefore, the feature of providing multiple sets of conditions defined in this way directly contributes to providing a flexible method adaptable to security and efficiency requirements. In the general case, the security required for the requested data-transfer can be quantified in terms of an arbitrary but comparable measure for the granularity in user interaction and degree of detail in data control. While the providing of two or more defined sets of conditions allows for options in selecting a smart contract to meet required security, the selection process preferably additionally includes the determination of one of the defined smart contracts best fitting the requirement, as measured by mathematical distance of quantifiable security levels.

In a preferred embodiment, the determination of a security required for the requested data-transfer is based on the data-transfer request and/or based on the data to be transferred. While generally, the security required can be just manually selected 230, i.e. by additional user interaction via data transfers to/from a user, without any additional information required to be comprised in the data-transfer request 220, in a preferred aspect of the present disclosure, data pertaining to a required security level is comprised, directly or indirectly, in the received 220 data-transfer request. This data can include a direct relation to a security level previously defined as set of conditions 210. This data can also only include a level of granularity from which an appropriate security level as defined 210 can be matched in an additional step 230. Additionally or alternatively, the determination of required security level can be dependent on the data to be transferred when the requested transfer is executed 250*a*. For this, the request 220 comprises information about the data requested, i.e. metadata, from which directly or indirectly, a required security level can be determined. This can be the sensitivity of underlying data, their (monetary) value, benchmarking to other (meta) data, and other factors. This can also be/contain information about encryption and/or de-identification of the underlying data. A link to the requested data, from which, e.g. at the storing database, further information about corresponding data pertaining to a security level required, is a viable implementation as well.

In a further preferred aspect of the present disclosure, the method further comprises the step of recording 260 approval of user consent after requesting user consent, i.e. during execution of the smart contract 240, and before execution 250*a/b* of data transfers and/or further comprising the step of recording the execution of data transfer after execution 250*a/b* of the data transfer. As inherent to smart contracts, every complete execution of such will be stored on the underlying ledger system. It is preferred for reasons of traceability and auditing to optionally include recordings 260 of single consent-request/approvals and/or the result of the execution 250*a/b*. Recording 260 of single consents or a series of consent making up the whole smart contract is additionally beneficial for cases, in which a smart contract was executed 240 with a fraction of the requested consent requests not approved, i.e. yielding a prevention of the requested data transfer 250*b*. A repetition of the same contract could then make use of such recorded 260 partially approved smart contracts to only request additional consent according to what was left to be approved after the first execution. Erroneously non-approved smart contracts can then be repeated/corrected in a very efficient way saving interactions with the ledger and therefore system resources.

In an additional aspect of the present disclosure, the method step of selecting 230 of a defined set of conditions is performed by balancing data-transfer security and total complexity of the transactions comprised in the requested data transfer. The balancing relates to a comparison of security levels determined as required and the security levels attributable to the multiple defined 210 sets of conditions 270 created as smart contracts. In a straightforward implementation, the balancing identifies the one of the multiple defined sets of conditions, which can be attributed the lowest security level above the security defined as required.

Preferably, the multiple defined 210 and subsequently selected 230 security levels 210 are implemented in a way that allows for scaling a reduction in required security of the data transfer to a reduction in process demand on the ledger 130 component. For this, the following multitude of security levels 270 as realizable by smart contracts 131 are considered preferred embodiments of the present disclosure. They can be employed in combination to synergetic effect on the efficiency, flexibility and security of the total system.

One specifically defined security level 271 selectable from a multitude of defined security levels 270 according to the present disclosure reflects a multi-consent single-asset transaction, wherein all single sub-data units making up the total data transfer are required to be consented to by multiple users party to the transfer. This is implemented by specifying one sequence 271 of user-consent steps to comprise the request for respective independent consent of two or more users for each single data transaction comprised in the requested data transfer. Only when all user consent requests, i.e. independently from each user to each asset transaction, are approved, the smart contract defined in this way is executed 250*a* and the transfer is prompted to be executed. In case one single consent request of one single user is not approved, the requested transfer is not executed, i.e. prevented 250*b*. This security level is considered the most secure one giving the parties' total control over what data to which level of granularity is exchanged. As every consent required by the smart contract 131 requires an interaction with the ledger 130, the sequence of system processes implied by this security level is also considered to put the highest technical demand on the ledger component 130.

One further specifically defined security level 272 selectable from a multitude of defined security levels 270 according to the present disclosure reflects a single-consent single-asset transaction, wherein all single sub-data units making up the total data transfer are required to be consented to by one user party to the transfer while another user party to the transfer is only required to consent once to the transfer of all their data, independent on granularity. This is implemented by specifying one sequence 272 of user-consent steps to comprise the request for respective independent consent of one user for each single data transaction comprised in the requested data transfer and one single consent of one or more other user/users to all transactions comprised in the requested data transfer. This security level 272 is considered less secure than one reflecting multi-consent single-asset transactions 271, as for one user the control of consenting to data transfers is limited to one interaction only. The limitation of interactions is beneficial to the reduction on system demand. Particularly, in data transfers in which one user contributes a vast fraction of transactions as part of the transfer, and one other party is selective about which of the transactions are to be performed on a case-by-case basis, the implementation of such a security level 272 as described adds flexibility and efficiency to the process. For the implementation of such security level 272, it is further preferred if only partial data transfers according to the transactions consented to 240 are executed in step 250*a*.

One further specifically defined security level 273 selectable from a multitude of defined security levels 270 according to the present disclosure reflects a single-consent multi-asset transaction, wherein all single sub-data units making up the total data transfer are required to be consented to only once by all users party to the transfer. This is implemented by specifying one sequence 273 of user-consent steps to comprise the request for one single respective consent of two or more users to all transactions comprised in the requested data transfer. This security level 273 is considered less secure than the security levels 271, 272 previously described, as for all users the control of consenting to data transfers is limited to one interaction only. The limitation of interactions is beneficial to the reduction on system demand. Particularly, in data transfers in which one user contributes a vast amount of transactions as part of the transfer, and one other party is not selective about which of the transactions are to be performed on a case-by-case basis, the implementation of such a security level 273 as described significantly adds to the efficiency to the process.

One further specifically defined security level 274 selectable from a multitude of defined security levels 270 according to the present disclosure reflects a bulk transaction, wherein all single sub-data units making up the total data transfer are required to be consented to only once by only one user party to the transfer. This is implemented by specifying one sequence 274 of user-consent steps to comprise the request for one single consent of one single user to all transactions comprised in the requested data transfer. This security level is considered to provide less security relative to the levels discussed 271, 272, 273, as only one user is enabled to influence, via consent to the data transfer, the control over the data. A particular use case is found in a scenario where availability of data in a database is considered transfer consent of the data-providing user. Therefore, the data-transfer regulation process can be limited to the least interaction with the system, i.e. one single consent approval of one other user within the smart contract execution 240.

Any combination of defined security levels 271, 272, 273, 274 can be comprised in the multitude defined 270.

In one preferred aspect of the present disclosure the consent approval is a passive process. As opposed to active approval that requires the interaction of a user for validation, a passive consent approval is implemented by verifying only the existence of one historical active consent by the respective user. Every consent request approval subsequent to the first one is then considered to be approved if the one historic consent is not actively withdrawn by the user at the time of the data transfer request and/or execution. This implementation allows for reduced redundancy, translating to technical efficiency, in sequential data transfers including at least one of the same users.

Methods and systems of the present disclosure are particularly advantageous in management of medical-data transfers. Medical data has inherent value to its provider and user, since non-negligible effort, measurements, studies, etc., are required to obtain such data. Additionally, medical data is widely considered of special sensitivity, which imposes a certain requirement on security when such data is dealt with. Since the medical system is usually subject to interactions of many parties (patients, practitioners, data analysts, insurers, etc.) of various interest and access to the medical data, it is particularly demanding on a data-transfer system and methods. Finally, handling of medical data is subject to regulatory constraints, which are implemented differently on regional/national levels and subject to changes over time.

The provided system and method provide a technological solution for the above stated aspects in medical-data management by providing a flexible, secure and efficient platform, which is scalable in accordance with user requirements.

It will be appreciated that the execution of the various machine-implemented processes and steps described herein may occur via the execution, by one or more respective processors, of processor-executable instructions stored on one or more tangible, non-transitory computer-readable mediums (such as random access memory (RAM), read-only memory (ROM), programmable read-only memory (PROM), and/or another electronic memory mechanism). Thus, for example, operations performed by various components as discussed herein may be carried out according to instructions stored on and/or applications installed on one or more respective computing devices.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

The invention claimed is:

1. A method of securing data transfers, comprising:

defining, by a middle layer subsystem of a blockchain-regulated data-management system, two or more sets of conditions for executing a data transfer as a sequence of user-consent steps in the form of respective smart contracts;

receiving, by the middle layer subsystem, a data-transfer request;

determining, by the middle layer subsystem, a required security for the data-transfer request, wherein the required security for the data-transfer request is determined from a plurality of security levels having different processing demands;

selecting, by the middle layer subsystem, one of the defined sets of conditions according to the determination;

requesting, by the middle layer subsystem, user consent according to a sequence defined by a smart contract corresponding to the selected set of conditions; and executing, by the middle layer subsystem, the requested data transfer after the request is approved.

2. The method of claim 1, wherein the determination of the required security for the requested data-transfer is based on the data-transfer request and/or based on the data to be transferred.

3. The method of claim 1, further comprising:

after requesting the user consent and before executing the requested data transfer, recording approval of user consent.

4. The method of claim 1, further comprising:

after executing the requested data transfer, recording the execution of the requested data transfer.

5. The method of claim 1, wherein the sequence of user-consent steps comprises a request for respective independent consent of two or more users for each single data transaction comprised in the requested data transfer.

6. The method of claim 5, wherein the respective independent consent of the two or more users corresponds to passive consent of the two or more users.

7. The method of claim 1, wherein the sequence of user-consent steps comprises a request for respective independent consent of one user for each single data transaction comprised in the requested data transfer and one single consent of one or more other users to all transactions comprised in the requested data transfer.

8. The method of claim 1, wherein the sequence of user-consent steps comprises a request for one single respective consent of two or more users to all transactions comprised in the requested data transfer.

9. The method of claim 1, wherein the sequence of user-consent steps comprises a request for one single consent of one single user to all transactions comprised in the requested data transfer.

10. The method of claim 1, wherein the required security for the data-transfer request is determined based on sensitivity of the to-be-transferred data.

11. A middle layer subsystem of a blockchain-regulated data-management system for securing data transfers, wherein the middle layer subsystem comprises:

interfaces to one or more user systems;

one or more interfaces to a database;

one or more interfaces to a distributed ledger system; and a processor configured to:

receive a data-transfer request;

create, based on input from the interfaces to the one or more user systems and/or the one or more interfaces to the database, two or more sets of conditions for executing a data transfer to or from the database as a sequence of user-consent steps in the form of respective smart contracts to be stored on the distributed ledger system;

determine a required security for the requested data transfer, wherein the required security for the data-transfer request is determined from a plurality of security levels having different processing demands;

select one of the defined sets of conditions according to the determination;

request user consent according to a sequence defined by a smart contract corresponding to the selected set of conditions; and execute the requested data transfer after the request is approved.

12. The system of claim 11, wherein the processor is further configured to:

create the smart contracts.

13. The system of claim 11, wherein the processor is further configured to:

prompt execution of data transfers to or from the database after receiving a prompt from the interface to the distributed ledger system.

14. The system of claim 11, wherein the processor is further configured to:

transmit consent-request data from the distributed ledger system to one or more user via one or more respective interfaces of the interfaces to the one or more user systems; and transmit consent-approval data from the one or more users to the distributed ledger system via the interface to the distributed ledger system.

15. A non-transitory computer-readable medium having processor-executable instructions stored thereon for securing data transfers, wherein the processor-executable instructions, when executed, facilitate performance of the following:

defining, by a middle layer subsystem of a blockchain-regulated data-management system, two or more sets of conditions for executing a data transfer as a sequence of user-consent steps in the form of respective smart contracts;

receiving, by the middle layer subsystem, a data-transfer request;

determining, by the middle layer subsystem, a required security for the data-transfer request, wherein the required security for the data-transfer request is determined from a plurality of security levels having different processing demands;

selecting, by the middle layer subsystem, one of the defined sets of conditions according to the determination;

requesting, by the middle layer subsystem, user consent according to a sequence defined by a smart contract corresponding to the selected set of conditions; and executing, by the middle layer subsystem, the requested data transfer after the request is approved.

16. The non-transitory computer-readable medium of claim 15, wherein the determination of the required security for the requested data-transfer is based on the data-transfer request and/or based on the data to be transferred.

17. The non-transitory computer-readable medium of claim 15, wherein the processor-executable instructions, when executed, further facilitate performance of the following:

after requesting the user consent and before executing the requested data transfer, recording approval of user consent.

18. The non-transitory computer-readable medium of claim 15, wherein the processor-executable instructions, when executed, further facilitate performance of the following:

after executing the requested data transfer, recording the execution of the requested data transfer.

19. The non-transitory computer-readable medium of claim 15, wherein the sequence of user-consent steps comprises a request for respective independent consent of two or more users for each single data transaction comprised in the requested data transfer.

* * * * *